United States Patent [19]

Gunesin et al.

[11] Patent Number: 5,270,395

[45] Date of Patent: * Dec. 14, 1993

[54] PROCESS OF DISPERSION POLYMERIZATION OF BUTADIENE IN PROPANE OR BUTANE

[75] Inventors: Binnur Z. Gunesin, New York, N.Y.; Paul A. Pindris, Red Bank, N.J.

[73] Assignee: BASF Corporation, Parsippany, N.J.

[*] Notice: The portion of the term of this patent subsequent to May 5, 2009 has been disclaimed.

[21] Appl. No.: 614,651

[22] Filed: Nov. 16, 1990

Related U.S. Application Data

[63] Continuation-in-part of Ser. No. 370,104, Jun. 19, 1989, Pat. No. 4,985,505, which is a continuation of Ser. No. 44,688, May 1, 1987, abandoned.

[51] Int. Cl.$^5$ .................. C08F 4/00; C08F 297/00; C08F 297/02; C08F 297/04
[52] U.S. Cl. .................. 525/250; 525/244; 525/252; 525/271; 525/314
[58] Field of Search ............. 525/250, 244, 252, 271, 525/314

[56] References Cited

U.S. PATENT DOCUMENTS

| | | | |
|---|---|---|---|
| 3,770,712 | 11/1973 | Schwab | 260/93.5 |
| 3,948,846 | 4/1976 | Waters | 525/242 |
| 4,386,125 | 5/1983 | Shiraki et al. | 428/36 |
| 4,418,185 | 11/1983 | Throckmorton et al. | 526/201 |
| 4,985,505 | 1/1991 | Gunesin et al. | 525/250 |

FOREIGN PATENT DOCUMENTS

| | | |
|---|---|---|
| 1495814 | 4/1970 | Fed. Rep. of Germany. |
| 2728577 | 12/1977 | Fed. Rep. of Germany. |
| 1039256 | 8/1966 | United Kingdom. |

Primary Examiner—John Kight, III
Assistant Examiner—Duc Truong
Attorney, Agent, or Firm—Dennis V. Carmen

[57] ABSTRACT

Butadiene is polymerized alone or with a monomer such as styrene in a dispersion in propane, butane or its mixtures with minor amounts of other $C_4$-$C_6$ alkanes, e.g., n-pentane and a dispersant which is preferably a hydrogenated styrene/conjugated diene block copolymer to achieve stable dispersions at higher solids and butadiene levels possible with similar alkane dispersants.

26 Claims, No Drawings

PROCESS OF DISPERSION POLYMERIZATION OF BUTADIENE IN PROPANE OR BUTANE

CROSS-REFERENCE TO RELATED APPLICATIONS

This application is a continuation-in-part of allowed U.S. application, Ser. No. 370,104, filed Jun. 19, 1989 now U.S. Pat. No. 4,985,505 which in turn is a continuation of U.S. application Ser. No. 044,688 filed May 1, 1987 (now abandoned), each of those two applications being relied upon and incorporated by reference herein in its entirety. U.S. Pat. No. 4,871,814, issued on U.S. application Ser. No. 065,658 filed Jun. 22, 1987, which was a continuation of U.S. application Ser. No. 901,506 filed Aug. 28, 1986 (and now abandoned) was copending with said U.S. application Ser. No. 044,688 filed May 1, 1987 and was incorporated by reference into said U.S. application Ser. No. 044,688; that U.S. Patent discloses the preparation of linear block copolymers of styrene and butadiene and the like containing five or more blocks by anionic dispersion polymerization in solvents such as alkanes, particularly hexane. This U.S. Pat. No. 4,871,814 is incorporated herein by reference in its entirety.

BACKGROUND OF THE INVENTION

Polymers and copolymers containing polymerized conjugated dienes such as butadiene are typically prepared in polymerization systems which include a solvent inert to the polymerization in which the final polymer or copolymer is at least partially soluble. This creates a problem of complete solvent removal. This invention is based on the discovery that polymers and copolymers of conjugated dienes especially those derived from butadiene have little or no solubility in propane or butane. Their use as a dispersing medium for the reaction results in easy removal due to the poor solubility of the polymer in the medium and its high vapor pressure.

SUMMARY OF THE INVENTION

Conjugated diene polymers, particularly block copolymers containing blocks of (A) polymerized styrene or alkyl-styrene units, and (B) polymerized conjugated diene units are prepared by dispersion polymerization under pressure in propane or butane, or a mixture comprising a major proportion of propane or butane. The process of this invention is particularly suitable for the preparation of block copolymers of styrene and butadiene containing at least 20 weight percent solids and at least 25 weight percent butadiene.

DETAILED DESCRIPTION OF THE INVENTION

The general conditions useful in the process of this invention are described in U.S. Pat. No. 3,770,712 which is incorporated herein by reference in its entirety. This patent and others described the slurry polymerization of monomers such as styrene and the preparation of various polymers, particularly block copolymers which can include monomers such as conjugated dienes.

The process is applicable to the polymerization of conjugated dienes and to the preparation of block copolymers containing one or more A and B blocks in which the A blocks are styrene or substituted styrene and the B blocks are conjugated diene. Suitable substituted styrenes include alkyl substituted styrenes, particularly methyl-substituted styrenes such as para-methylstyrene. Styrenes with polar groups such as chlorine substituents cannot be used in anionic polymerization to which this invention is particularly applicable. One or more appropriate styrene monomers can be used.

The B block comprising polymerized conjugated diene units can be formed from any anionically polymerizable conjugated diene, particularly butadiene, isoprene and dimethyl-butadiene.

Suitable anionic catalysts include butyl-lithium, sec-butyl-lithium and t-butyl-lithium. The concentration of the catalyst is generally from about $10^{-1}$ to $10^{-4}$ moles/100 g of monomer.

The reaction is conducted in an aliphatic hydrocarbon medium comprising a major proportion of propane, isobutane or n-butane, which is a non-solvent for the polymer. The medium can contain alkanes having between about 4 and 6 carbon atoms, in minor amounts in addition to the propane or butane. Examples of solvents useful in conjunction with propane or butane are isobutane, pentane, isopentane, hexane, 2,2-dimethyl-butane, and petroleum ether. When present, these solvents preferably comprise less than 25 weight percent and most preferably 0 to 15 weight percent of the dispersing medium, the major proportion being propane or butane. The preferred major component in the dispersing medium is n-butane and the preferred minor component is n-pentane. Preferably the n-pentane comprises 10 to 20 weight percent, and the n-butane comprises 80 to 90 weight percent.

The process of polymerization can be carried out at temperatures between 30° C. and about 100° C. Because propane or butane, which are necessary components of the dispersing medium, boil well below room temperature, the reaction is conducted under super-atmospheric pressure, preferably 2 to 18 bars and most preferably 4 to 8 bars. The highly volatile solvent system is advantageous in separating the polymer particles from the dispersing medium.

The polymeric dispersing agent which is used to maintain the polymer in suspension as it is formed is advantageously an A-B block copolymer containing blocks which are similar to or the same as the blocks in the copolymer being produced. Preferably, the block copolymer used as a dispersing agent is hydrogenated. A diblock polymer comprising hydrogenated styrene and isoprene blocks having a number average molecular weight of 140,000 and a styrene content of about 40% has been found to be particularly advantageous. The dispersing agent is generally present in amounts of about 0.1 to 5.0 weight percent of the monomers.

Generally linear block copolymers prepared in accordance with this invention have two or more (e.g., 2-10) alternating blocks of (A) units comprising polymerized styrene or substituted styrene and (B) units comprising polymerized conjugated diene units. Where the copolymer contains three or more blocks, it is preferred that the terminal blocks are (A) blocks. Thus, a copolymer containing five blocks have the configuration A-B-A-B-A. Block copolymers containing less than 75 weight percent of the A (styrenic) units are preferred. Thus, the B component generally comprises at least 25 weight percent of the block copolymer, and preferably 25 to 40 weight percent.

The process of this invention is also suitable for the preparation of "star-block" or radial copolymers having a non-linear configuration such as described in U.S. Pat. Nos. 3,639,517 and 4,091,053 which are incorporated herein by reference, as well as those described in other patents and literature.

Because the process used for polymerization is a dispersion (slurry) process, the high viscosity of high molecular weight polymer imposes no constraint on the molecular weight of the block copolymers. And since high molecular weight polymers have desirable physical properties, the process of this invention is advantageously used in producing polymers having high molecular weight. Accordingly, number average molecular weights in the range of 80,000 to 200,000 are contemplated and suitable copolymers in the molecular weight range of 100,000 to 150,000 have been prepared. Although the block copolymers have high molecular weights, high polymer concentrations relative to the solvent dispersing medium in the range of 20 weight percent to 40 weight percent of polymer are readily achieved. Using solution polymerization techniques, it would not be possible to obtain such high molecular weights at the high polymer concentrations readily achievable with the process of this invention because the solution viscosities would be too high.

Block copolymers having excellent physical properties, particularly elongation and impact strength, can be obtained. The polymers are useful, as such, in the preparation of containers such as cups, that can be coextruded with high impact polystyrene to achieve a glossy and clear surface, and they can be blended with crystal polystyrene to improve the physical properties of polystyrene. They exhibit excellent compatibility with polystyrene than many presently available materials used for this purpose.

The polymerized products of this invention which still contain the highly volatile dispersing medium including propane or butane can be directly extruded into foams in the conventional manner using the dispersing medium as a foaming agent.

This invention is illustrated by the following non-limiting examples in which all parts are by weight unless otherwise stated.

EXAMPLE 1

A 1 liter glass high pressure reactor which is controlled by 135 psi rupture disk was flushed with N and the following ingredients added:
360 g n-butane
60 g pentane
40 g styrene
1.2 g hydrogenated styrene/butadiene diblock copolymer (140.000 Mw)*
0.1 cc THF The unsaturated styrene/butadiene diblock is a commercially available product available from Firestone; it was hydrogenated at 50 psig hydrogen pressure at room temperature using bis (1,5-cyclooctadiene nickel) for 3½ hours.

The reactor was pressurized by $N_2$ up to 100 psi to keep solvents in liquid form; and 0.5 ml of 1.0 M sec-butyl lithium was added. Reaction was carried out for 45 min. Two hours later 30 g of butadiene was introduced into the pressurized reactor. Temperature was raised to 65° C. Upon reaction completion, reethanol was added to terminate the polymerization and 10 ml. of 5% solution of Halby DCTDP (a phenolic antioxidant) was added. The dispersion was stable throughout the reaction.

EXAMPLE 2

A 1 liter glass high pressure reactor which is controlled by 135 psi rupture disk was flushed with $N_2$ and the following ingredients added:
360 g n-butane
60 g pentane
40 g styrene
1.2 g polymeric dispersant (Shell-Vis 1702*)
0.1 cc tetrahydrofuran

* Shell-Vis 1702 is a hydrogenated diblock copolymer of styrene and isoprene having a number average molecular weight of about 140,000 and containing 40 wt. percent styrene available from Shell.

The reactor was pressurized by $N_2$ up to 60-100 psi to keep solvents in liquid form depending on temperature (25° C.–65° C.) and 0.5 ml of 1.0 M sec-butyl lithium was added. Reaction was carried out for 45 min. Two hours later 30 g of butadiene was introduced into the pressurized reactor. Temperature was 60° C. and upon reaction completion, methanol was added to terminate the polymerization and 10 ml. of 5% solution of Halby DCTDP (a phenolic antioxidant) was added. The dispersion was stable throughout the reaction. The pressure was released and the A-B block polymer was recovered as a powder form.

COMPARATIVE EXAMPLE

Using the procedure of Example 2 but substituting n-hexane for the n-butane/n-pentane system resulted in agglomeration of swollen polymeric particles which exhibit very high viscosity and none of the characteristics of a dispersion. At this stage, the polymerization of further monomer is unfeasible.

EXAMPLE 3

Following the procedure of Example 2 prior to termination of the reaction, additional styrene is added incrementally to add an A block resulting in an A-B-A block copolymer, and incremental amounts of styrene and butadiene are separately added in stages to produce A-B-A-B-A and A-B-A-B-A-B-A block copolymers.

Although the present invention has been described with preferred embodiments, it is to be understood that i modifications and variations can be made without departing from the spirit and scope of this invention, as those skilled in the art will readily understand. Such modifications and variations are considered to be within the purview and scope of the appended claims.

We claim:

1. A process for the dispersion polymerization of at least two monomers, wherein the first monomer is styrene or an alkyl-styrene and the second monomer is a conjugated diene, to a block polymer containing at least 25 weight percent of the diene comprising conducting the polymerization under superatmospheric pressure with an anionic polymerization catalyst in a dispersing medium consisting essentially of propane, n-butane or isobutane, and a hydrogenated styrene or an alkyl-styrene/butadiene block copolymeric dispersing agent effective to provide a stable dispersion, and recovering the block polymer product.

2. The process of claim 1 in which said dispersing medium is admixed with pentane present in an amount of up to 25 weight percent.

3. The process of claim 1 in which said dispersing medium comprises n-butane and is admixed with 1 to 20 weight percent of n-pentane.

4. The process of claim 1 which is conducted at pressures of 2 to 10 bars.

5. The process of claim 2 which is conducted at pressures of 2 to 10 bars.

6. The process of claim 3 which is conducted at pressures of 2 to 10 bars.

7. The process of claim 2 in which the polybutadiene polymer product is recovered by flash drying.

8. The process of claim 1 in which said polybutadiene polymer product is an A-B block copolymer of (A) polymerized styrene or alkyl styrene units and 25 to 80 weight percent of (B) polymerized butadiene units.

9. The process of claim 1 in which said polybutadiene polymer product is a block copolymer containing 3 or more alternating A and B units where (A) is polymerized styrene or alkyl styrene units and (B) is 25 to 80 weight percent of polymerized butadiene units.

10. The process of claim 1 in which said polybutadiene polymer product is a star-block copolymer comprising (A) polymerized styrene or alkyl styrene units and (B) polymerized butadiene units.

11. The process of claim 1 in which said catalyst is sec-butyl lithium.

12. The process of claim 1 in which the polymeric product containing the dispersing medium is transferred to an extruder and directly extruded into a foam by using the dispersing medium as a foaming agent.

13. The process of claim 12, wherein the dispersing medium is butane.

14. The process of claim 1 in which said block polymer product contains 25 to 40 weight percent of the polymerized diene.

15. The process of claim 3 in which said dispersing medium consists essentially of 80 to 90 weight percent of n-butane and 10 to 20 weight percent of n-pentane.

16. The process of claim 3 in which said second monomer is isoprene.

17. The process of claim 3 in which said second monomer is dimethyl butadiene.

18. The process of claim 1 wherein the block polymer has number average molecular weight of 80,000 to 200,000.

19. The process of claim 18 wherein the block polymer has number average molecular weight of 100,000 to 150,000.

20. The process of claim 1 wherein the dispersing medium contains alkanes having 4 to 6 carbon atoms present in an amount of less than 25 weight percent.

21. The process of claim 20 wherein the dispersing medium contains alkanes having 4 to 6 carbon atoms present in an amount of up to 15 weight percent.

22. The process of claim 21 wherein the dispersing medium consists essentially of 80 to 90 weight percent of n-butane and 10 to 20 weight percent of n-pentane.

23. The process of claim 1 wherein the hydrogenated styrene block copolymer has a number average molecular weight of about 140,000 and contains about 40 weight percent of styrene.

24. The process of claim 1 wherein the amount of the dispersing agent used in the process is about 0.1 to 5.0 weight percent of the monomers.

25. The process of claim 1 wherein the first monomer is introduced initially into the dispersing medium and polymerized to a block homopolymer of the first monomer, and subsequently, the second monomer is introduced into the dispersing medium and polymerized to a block homopolymer of the second monomer, thereby forming the block polymer product.

26. A process for the dispersion polymerization of at least two monomers, wherein the first monomer is styrene or an alkyl-styrene and the second monomer is a conjugated diene, to a block polymer containing at least 25 weight percent of the diene comprising conducting the polymerization under superatmospheric pressure with an anionic polymerization catalyst in a dispersing medium consisting essentially of propane, n-butane or isobutane, and a hydrogenated styrene or an alkyl-styrene/conjugated diene block copolymeric dispersing agent effective to provide a stable dispersion, and recovering the block polymer product.

* * * * *